United States Patent
Knight et al.

(10) Patent No.: US 10,442,504 B1
(45) Date of Patent: Oct. 15, 2019

(54) SAFETY ACCESS SYSTEM FOR FLOAT ASSEMBLIES

(71) Applicants: James A. Knight, Pearl City, IL (US); William G. Decker, Pecatonica, IL (US)

(72) Inventors: James A. Knight, Pearl City, IL (US); William G. Decker, Pecatonica, IL (US)

(73) Assignee: Aqua-Aerobic Systems, Inc., Loves Park, IL (US)

( * ) Notice: Subject to any disclaimer, the term of this patent is extended or adjusted under 35 U.S.C. 154(b) by 0 days.

(21) Appl. No.: 15/939,866

(22) Filed: Mar. 29, 2018

(51) Int. Cl.
| | | |
|---|---|---|
| *B63B 27/00* | (2006.01) | |
| *C02F 1/74* | (2006.01) | |
| *C02F 3/14* | (2006.01) | |
| *C02F 103/00* | (2006.01) | |

(52) U.S. Cl.
CPC ............... *B63B 27/00* (2013.01); *C02F 1/74* (2013.01); *C02F 3/14* (2013.01); *C02F 2103/007* (2013.01); *C02F 2201/008* (2013.01)

(58) Field of Classification Search
CPC .... B63B 27/00; C02F 1/74; C02F 3/14; C02F 2103/007; C02F 2201/008; E04H 17/22; E04H 12/22; E04H 12/2215; E04H 12/2253; E04H 12/2269; Y10T 403/7005; Y10T 403/7007; F16B 21/02; F16B 21/04; F16B 7/20
USPC ............... 182/83, 85, 86, 106, 113; 403/361
See application file for complete search history.

(56) References Cited

U.S. PATENT DOCUMENTS

| | | | |
|---|---|---|---|
| 2,991,983 A | | 7/1961 | Logan |
| 4,422,771 A | | 12/1983 | Earhart |
| 4,723,848 A | | 2/1988 | Knight |
| 4,961,394 A | * | 10/1990 | Fornoff .................. B63B 35/38 114/266 |
| 5,185,992 A | * | 2/1993 | Garcia .................. A01B 1/227 56/400.04 |
| 6,328,285 B1 | * | 12/2001 | Wiseman ................ E04H 3/123 256/59 |
| 8,672,380 B2 | * | 3/2014 | Carter ..................... B60R 3/005 16/422 |
| 9,731,793 B1 | | 8/2017 | Knight |
| 2009/0322052 A1 | * | 12/2009 | Ruehl ....................... B60R 3/00 280/166 |
| 2013/0192149 A1 | * | 8/2013 | Roach ................... E01F 13/026 52/165 |

OTHER PUBLICATIONS

Soccertackle.com "goalpost ground socket locking plug" retrieved from the internet on Mar. 29, 2019, wayback machine archive for soccertakcle.com date back as far as Oct. 17, 2001. (Year: 2018).*
Aqua-Aerobic Systems, Inc., AquaDDM Direct-Drive Mixer brochure, 2012.
Aqua-Aerobic Systems, Inc., Aqua-Jet Surface Mechanical Aerator brochure, 2013.
Aqua-Aerobic Systems, Inc., OxyMix Pure Oxygen Mixer brochure, 2012.

* cited by examiner

*Primary Examiner* — Anthony D Wiest
(74) *Attorney, Agent, or Firm* — Vitale, Vickrey, Niro & Gasey LLP

(57) ABSTRACT

A safety access system for use on floats, typically in the field of water and wastewater treatment, the system including rotatable and removable handrails and sockets attached to the float to receive the handrails.

10 Claims, 9 Drawing Sheets

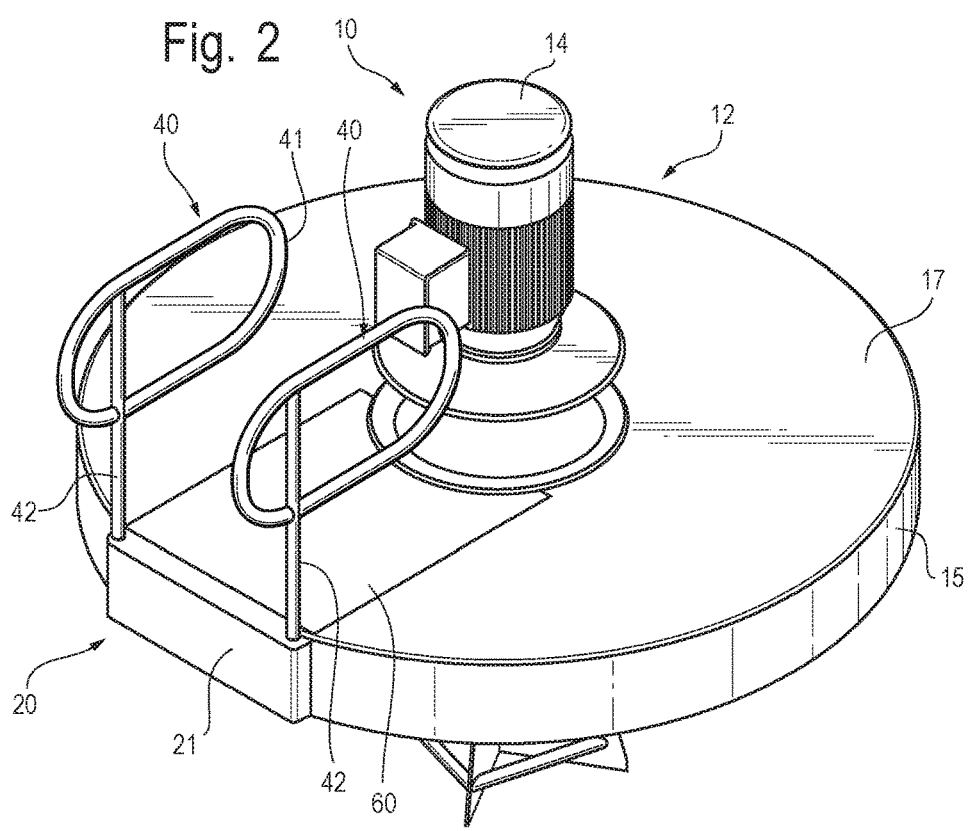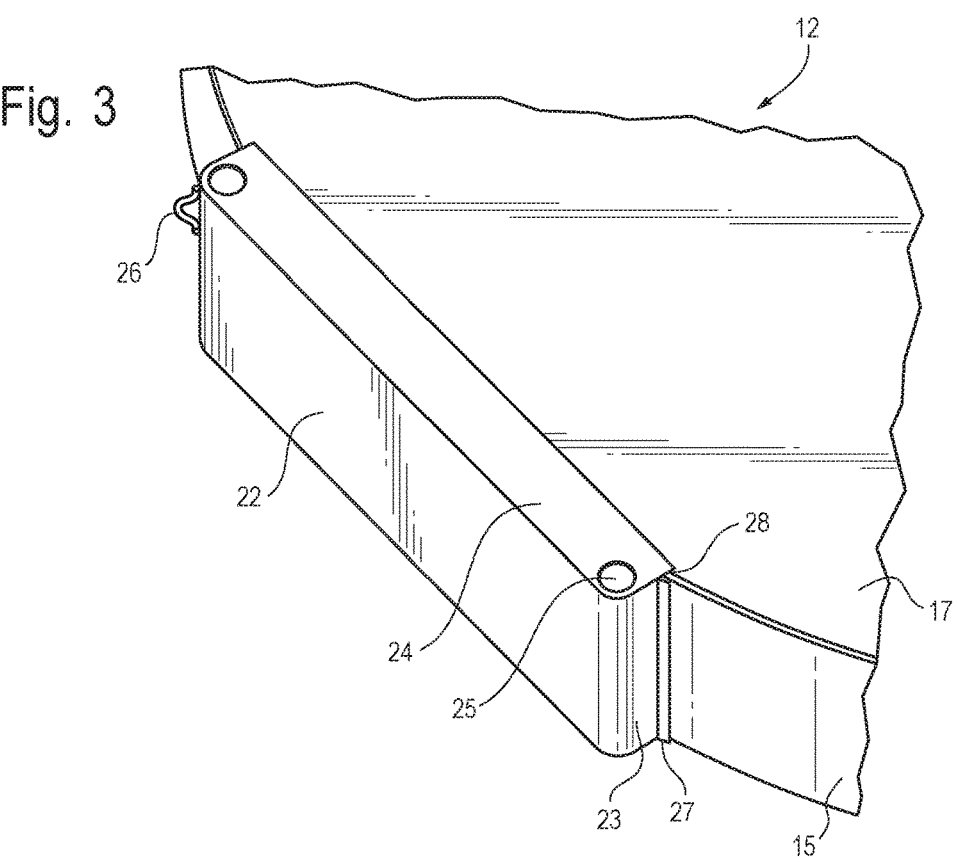

SAFETY ACCESS SYSTEM FOR FLOAT ASSEMBLIES

FIELD OF THE INVENTION

The present inventions relate generally to floats used with aerators and mixers in the treatment of water and wastewater. In particular, the present inventions relate to floats that are equipped with a safety access system to help protect workers during the maintenance and repair of floats and their associated equipment.

BACKGROUND OF THE INVENTION

Float assemblies that support equipment for the surface mixing or aeration of wastewater are well known. For example, typical downflow mixers are shown and described in U.S. Pat. Nos. 4,723,848; 4,422,771; and 2,991,983. In general, such mixers include an annular float that supports the mechanical components of the mixer. The floats support the equipment at the surface of the fluid in a lagoon, basin or other body of water to be treated. A drive motor is mounted on the top of the float and a propeller or other drive shaft is attached to the motor and extends downwardly therefrom below the float and into the fluid through a central opening in the float. A propeller or other fluid mixing device is attached to the drive shaft (see e.g., the OxyMix® pure oxygen mixer and the AquaDDM® direct drive mixer, both products of Aqua-Aerobic Systems, Inc., the assignee of this patent).

The structural arrangement of a typical floating aerator is similar to a floating downflow mixer. The mechanical components of the aerator are supported by a float, which is typically annular. Unlike a downflow mixer, however, an aerator typically pulls the fluid from the basin or lagoon and sprays it above the float to provide aeration (see e.g., the Aqua-Jet® surface mechanical aerator of Aqua-Aerobic Systems, Inc.).

In either case, the float and float assembly (and associated mechanical and electrical equipment and the like) is moored in place in the lagoon, basin or other body of fluid to be treated. Various types of mooring include post mooring, span mooring, cable mooring and pivotal mooring, as will be understood by those of skill in the art. In some situations, the float may be pulled to shore for repair and maintenance. However, in many instances, a plant operator or other maintenance personnel must travel to the float in the location in which it is moored.

In such situations, to effectuate repair or maintenance of the equipment supported by the float assembly on the surface of the fluid, the operator typically takes a boat to the aerator or mixer. The operator attaches the boat to a mooring ring typically provided on the float assembly. The operator then must maneuver onto the top surface of the float assembly, often while carrying tools or other equipment. Clearly, the upper surface of the float assembly may be slippery and the whole float is fairly unstable when loaded on one side with the weight of a person. This presents a potentially dangerous situation for maintenance personnel.

Accordingly, there is a need to provide a safety access system for float assemblies to aid an operator or maintenance person in getting onto and off of the float assembly, as well as helping prevent the operator from falling off of the float while performing repair or maintenance of the equipment. The present inventions are directed to such needs, both for new float assemblies and in retrofitting existing float assemblies.

SUMMARY OF THE INVENTION

The present inventions preserve the advantages of known surface aerators and mixers, as well as other equipment supported on the surface of a fluid using float assemblies, and also provide new features, advantages and results.

Therefore, it is an object of the present invention to provide a safety access system for use on float assemblies, the system including removable handrails.

Another object of the present invention is to provide a safety access system for floats that may be incorporated into existing floats or built as part of new floats.

A further object of the present invention is to provide an assembly attached to or made part of the float, such as a mounting bracket or sockets, that can secure removable handrails for the use and safety of workers.

An additional object of the present invention is to provide a safety access system having a mounting bracket that may be attached to a float for removably securing one or more handrails.

Still another object of the present invention is to provide a safety access system having removable handrails that have a lower mating portion that removably engages with a mounting bracket.

Still a further object of the present invention is to provide a safety access system having removable handrails with a lower mating portion adapted so that the similarly constructed handrails are useable on either side of the system.

Still an additional object of the present invention is to provide a safety access system having a mounting bracket including sockets having a guide and lock member to cooperate with the lower mating portion of the handrail to releasably secure the handrail to the mounting bracket.

Yet another object of the present invention is to provide a safety access system having sockets attached to the float, the sockets capable of accepting and securing removable handrails.

Yet an additional object of the present invention is to provide a safety access system having a mounting bracket and/or sockets, the mounting bracket and/or sockets including a guide and lock pin to cooperate with the mating portion of the handrails, such that the handrails may be locked into place by rotation and/or lifting to prevent inadvertent removal.

Accordingly, a safety access system for use on float assemblies is provided. The float assembly includes a float having a top surface and a perimeter surface. The safety access system includes a mounting bracket having a front portion, two side portions and a rear portion; two sockets, one socket attached to each side of the rear portion of the mounting bracket; two removable handrails, each handrail having a support post to support a guard rail portion and having a lower or mating portion; a guide and lock pin positioned within each socket; and, a receiving channel on the mating portion of the support post that cooperates with the guide and lock pin such that the mating portion of the support post is engaged in the socket. The mating portion of the support post may include a rotation guide channel in communication with the receiving channel as well as a lock portion in communication with the rotation guide channel. Alternatively, two opposing rotation guide channels may be provided (with or without lock portions) and which are in communication with each side of the receiving channel.

The present inventions also provide for a safety access system for use on a float assembly, the float assembly including a top surface and a perimeter surface. The safety system having: at least one socket attached to the float; a guide and lock pin positioned within the socket; at least one removable handrail having a support post, the support post having a lower mating portion; and, a receiving channel formed on the mating portion of the support post that cooperates with the guide and lock pin such that the mating portion of the support post is engaged in a desired orientation in the socket. The mating portion of the support post may include a rotation guide channel in communication with the receiving channel. The mating portion of the support post may further include a lock portion in communication with the rotation guide channel. Two opposing guide channels may be provided on the mating portion of the support post, each of which are in communication with the receiving channel. In a preferred embodiment, two lock portions or channels are provided, one in communication with each rotation guide channel. In one embodiment, the at least one socket is attached to the perimeter of the float. In another embodiment, two sockets are provided, each socket attached to or formed as part of the mounting bracket attached to the float.

In addition, a preferred embodiment of a safety access system for floats, the floats having a top surface and a perimeter surface is also provided. This embodiment includes: a mounting bracket having a front, two sides and a rear, the mounting bracket attached to the perimeter of the float; two sockets, each socket formed of a tubular member, each tubular member attached to each side and to the rear of the mounting bracket; two removable handrails, each handrail having a support post, the support post having a lower or mating member and an upper member supporting a guard rail portion; a guide and lock pin positioned within the tubular member of each socket; and, a channel lock slot assembly on the mating portion of the support post, the channel lock slot assembly including a receiving channel, two opposing rotation guide channels in communication with the receiving channel, wherein the receiving channel and rotation guide channel cooperate with the guide and lock pin. Each rotation guide channel may also terminate in a lock channel which is in communication with the rotation guide channel so as to lock the handrail in place and prevent the inadvertent removal thereof.

Inventor's Definition of the Terms

The terms used in the claims of this patent are intended to have their broadest meaning consistent with the requirements of law. Where alternative meanings are possible, the broadest meaning is intended. All words used in the claims are intended to be used in the normal, customary usage of grammar and the English language.

BRIEF DESCRIPTION OF THE DRAWINGS

The stated and unstated objects, features and advantages of the present inventions (sometimes used in the singular, but not excluding the plural) will become apparent from the following descriptions and drawings, wherein like reference numerals represent like elements in the various views, and in which:

FIG. 2 is a perspective view of a preferred embodiment of the present invention shown installed on a typical surface downflow mixer having an annular float.

FIG. 3 is a perspective view of a preferred embodiment of a mounting bracket of the present invention installed on the perimeter of a typical annular float assembly.

DETAILED DESCRIPTION OF PREFERRED EMBODIMENTS

Set forth below is a description of what is currently believed to be the preferred embodiments or best representative examples of the inventions claimed. Future and present alternatives and modifications to the embodiments and preferred embodiments are contemplated. Any alternatives or modifications which make insubstantial changes in function, purpose, structure or result are intended to be covered by the claims of this patent.

The present inventions have particular applicability to downflow mixers and aerators that are supported by float assemblies on the surface of a fluid to be treated. It will be understood by those of skill in the art that the present inventions may be used with other types of equipment that are supported on the surface of a fluid using float assemblies. And, although the present inventions are discussed in relation to the treatment of water or wastewater in a lagoon, basin or other body of fluid, the present inventions are not so limited. In addition, for simplicity, the present inventions are described in relation to typical annular floats. It will be understood by those of skill in the art that the inventions may be applied to floats of a different shape and configuration.

Figure 1:
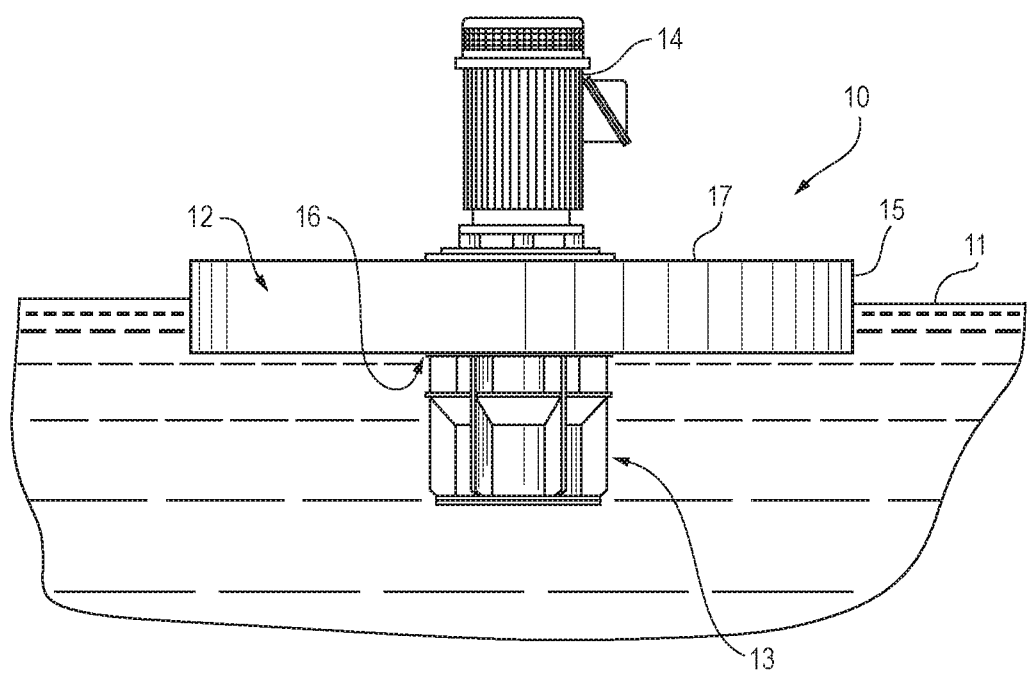
FIG. 1 is a side plan view of a typical prior art downflow mixer shown supported on the surface of a fluid using a typical annular float assembly.

A typical surface downflow mixer well known in the art is shown generally as 10 in FIG. 1. Mixer 10 includes an annular float 12 which supports the mechanical and electrical equipment 14 on the surface of a fluid 11. A drive motor 14 is typically provided and mounted to float 12 through a central opening in the float 12 by well known means. In a typical mixer, a drive shaft (not shown) extends downwardly from drive motor 14 through the central opening and terminates at a propeller (not shown). A draft tube 13 is typically provided on the underside of and extends through float 12.

Float assembly 12 includes an upper surface 17, a lower surface 16 and a perimeter or outer edge 15. As indicated, the present inventions are discussed in relation to float assemblies 12 having a generally circular shape and an annular opening in the center. It will be understood by those of skill in the art that the present inventions are equally applicable to float assemblies 12 having other shapes, including, for example, a square shape or radial arms (such as shown in U.S. Pat. No. 9,731,793 B1, assigned to Aqua-Aerobic Systems, Inc.). In addition, and as will be understood by those of ordinary skill in the art, float assembly 12 may be constructed from a variety of materials. For example, float 12 may be constructed of a stainless steel or other metal exterior forming a hollow interior which may be filled with foam or other buoyant material. Float 12 may also be constructed of fiberglass and also filled with a foam or other buoyant material. The present inventions have applicability to all float assemblies 12, regardless of their material or method of construction.

A preferred embodiment of the safety access system 20 of the present invention is shown in FIG. 2 installed on a typical float 12 of a typical downflow mixer 10. The principal components of a preferred embodiment of the safety access system 20 include a mounting bracket 21, a pair of removable handrails 40 and an optional non-skid surface 60 attached to the upper surface 17 of float 12. In general, safety access system 20 enables maintenance personnel to take a boat to mixer 10 and moor the boat to mooring bracket 26. In addition to tools and parts, the maintenance person would also take a pair of removable handrails 40. Upon arrival at float 12, the preferred handrails 40 are inserted into sockets 25 of mounting bracket 21 and rotated and locked into place as hereinafter described. Upon completion of work, removable handrails 40 will be removed and taken back to shore by the operator.

Figure 4:
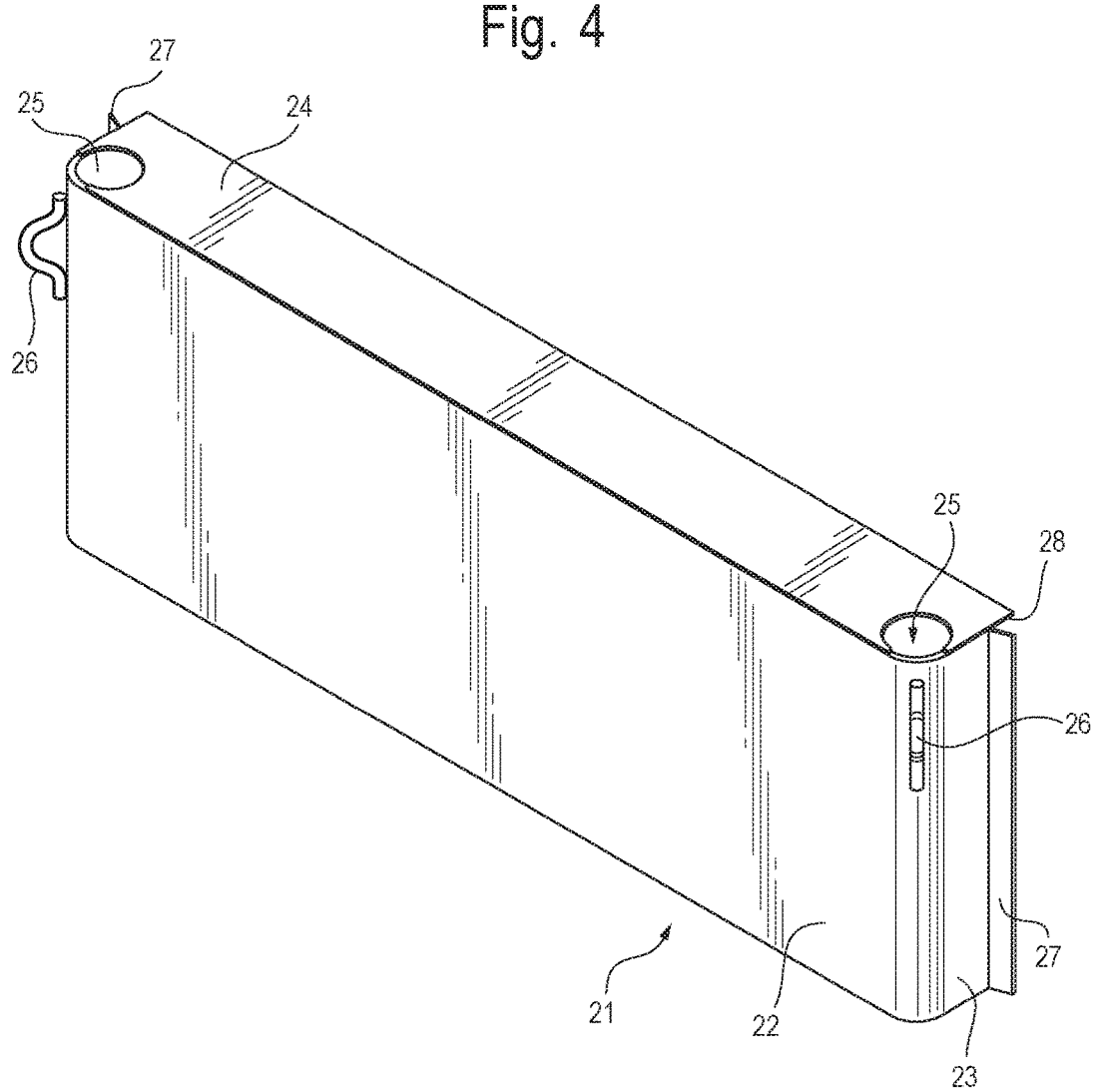
FIG. 4 is a front perspective view of a preferred embodiment of the mounting bracket of the present invention.
Figure 5:
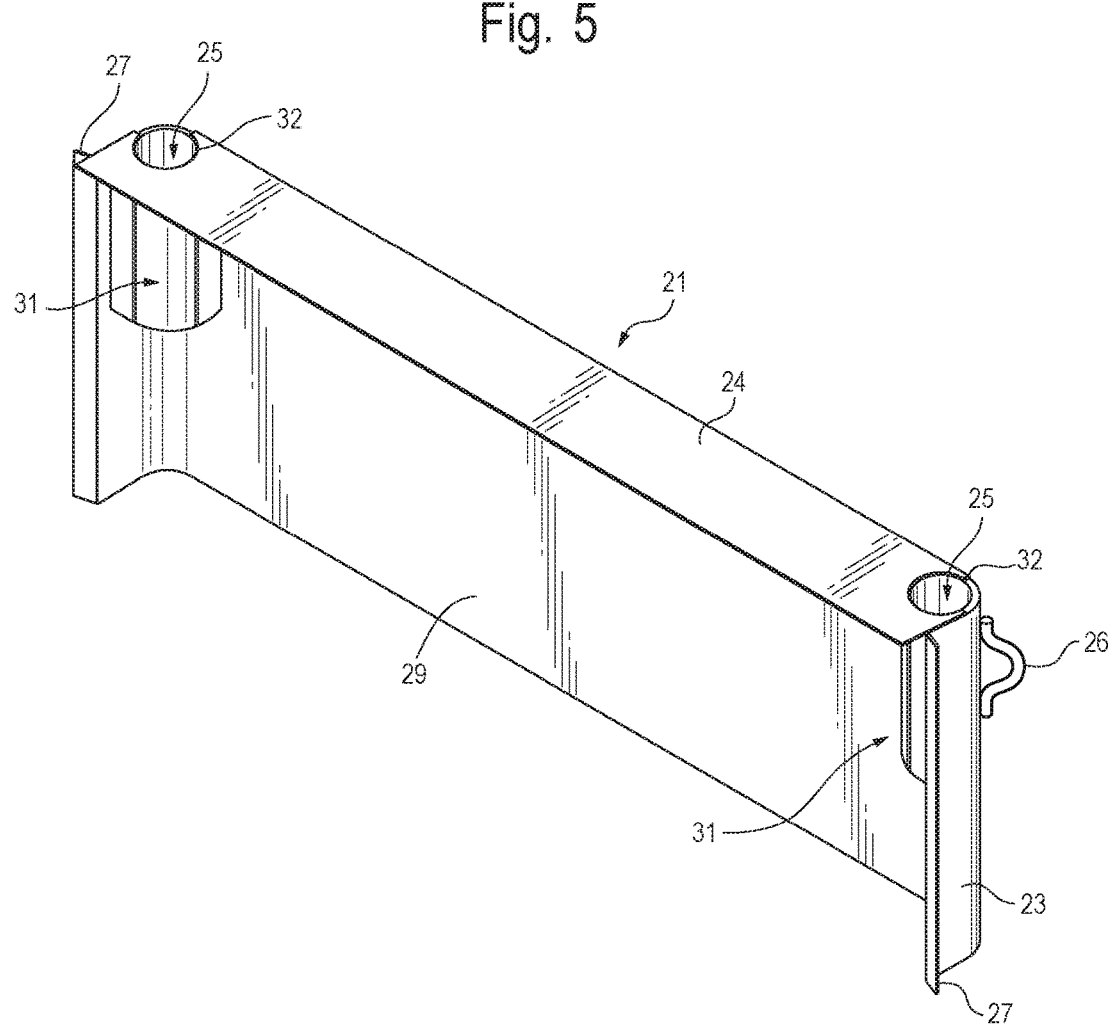
FIG. 5 is a rear perspective view of the mounting bracket of FIG. 4.
Figure 6:
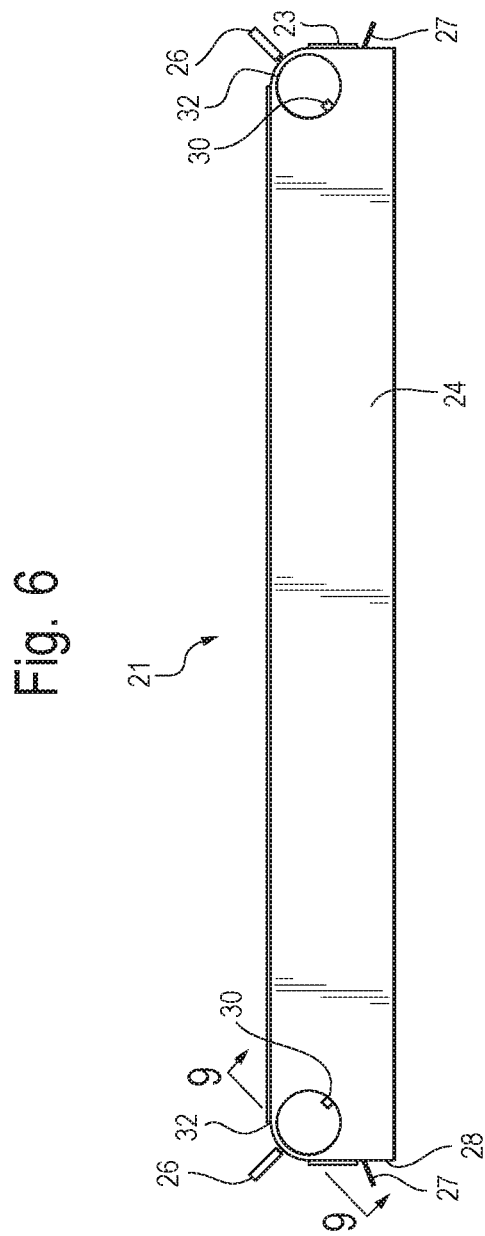
FIG. 6 is a top plan view of the mounting bracket of FIG. 4 showing the placement of the guide and lock pin within the preferred sockets of the present invention.
Figure 7:
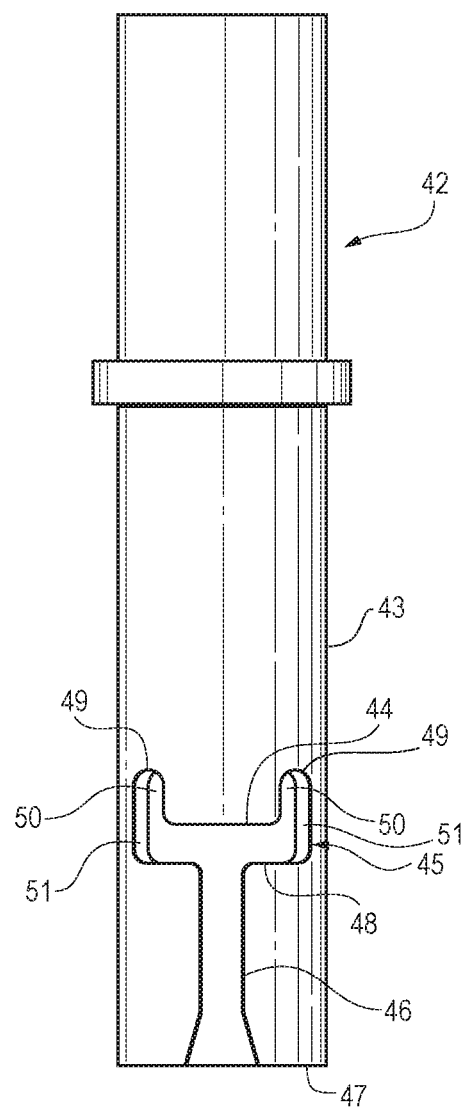
FIG. 7 is a perspective view of a preferred embodiment of the mating portion of a preferred embodiment of a handrail of the present invention also showing a preferred embodiment of a channel and lock slot assembly configuration.

A preferred embodiment of mounting bracket 21 may best be seen by reference to FIGS. 4, 5 and 6. Mounting bracket 21 includes a front face portion 22, two side portions 23 and an upper portion 24. Mounting bracket 21 also includes a rear face portion 29. In a preferred embodiment, two sockets 25, one at each side 23 of bracket 21, are provided and attached to the rear face 29 (FIG. 5). One or more mooring brackets 26 may also be included which are secured to mounting bracket 21 at a desired location, preferably the front face 22 or side portions 23. Mooring brackets 26 may also be secured to a portion of the float assembly 12 itself. As part of or attached to each side portion 23 of mounting bracket 21 is a flanged skirt 27 which may be used to mount bracket 21 to the perimeter 15 of float 12 as hereinafter described. Similarly, preferred upper portion 24 includes or is provided with a top lip 28 which may be attached to top surface 17 of float 12 as hereinafter described. Located within each socket 25 is a guide and lock pin 30 (see FIGS. 6, 9 and 10) which functions to receive and lock handrails 40 in the desired position as shown in FIG. 2.

Figure 9:
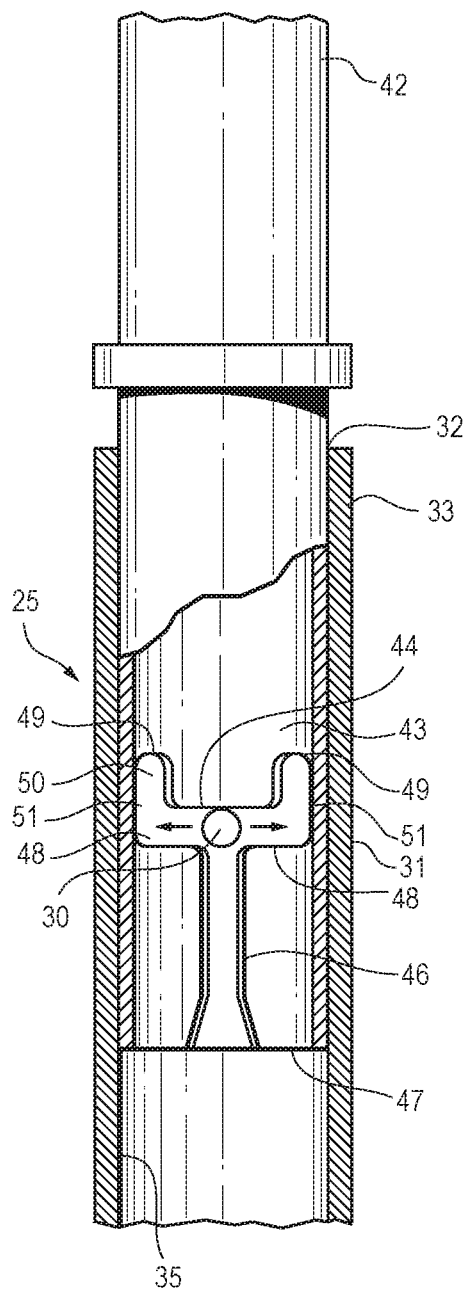
FIG. 9 is a side detailed, cut-out view of a preferred socket, guide and lock pin and preferred channel and lock slot assembly configuration of the present invention, taken along line 9-9 of FIG. 6, shown prior to rotation and locking of the handrail.
Figure 10:
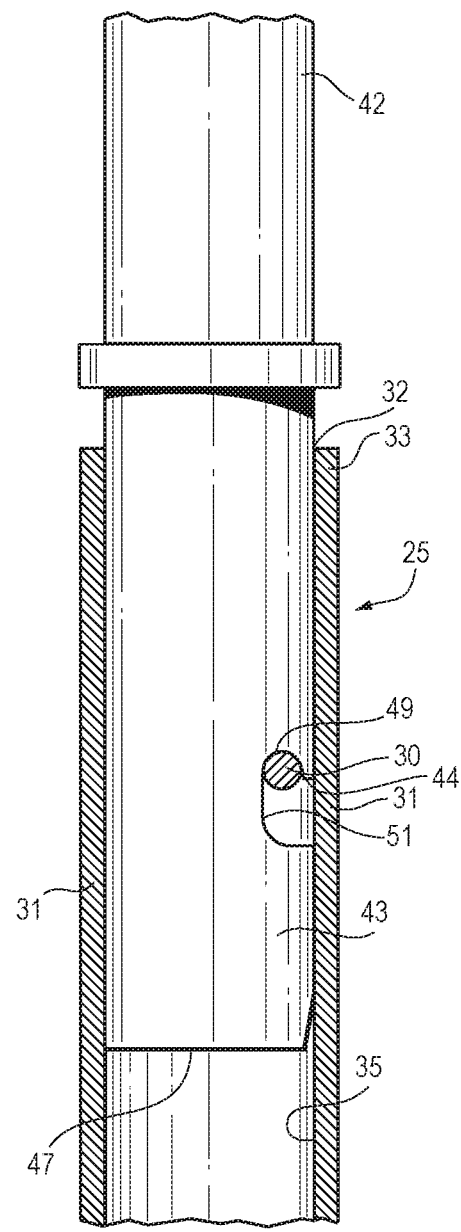
FIG. 10 is a side detailed, cut-out view of the preferred embodiment of FIG. 9 shown with the handrail rotated into a locked position.

A preferred embodiment of socket 25 may be seen by reference to FIGS. 5, 9 and 10. As shown, socket 25 may be formed from a tubular member 31 that is attached to rear face portion 29 of mounting bracket 21. The length of tubular member 31 of preferred sockets 25 helps provide lateral support to the handrails 40 when installed. The upper end 33 of tubular member 31 communicates with openings 32 on the upper portion 24 of bracket 21, if an upper portion 24 is provided. As indicated and as shown in FIGS. 6, 9 and 10, a guide and lock pin 30 is attached to an inner portion 35 of tubular member 31. It will be understood by those of skill in the art that guide and lock pin 30 may take a variety of configurations. For example, in a preferred embodiment, guide and lock pin 30 is a protrusion attached to the inner portion 35 of sockets 25 that interacts with the preferred channel and lock slot assembly 45 as hereinafter described. Guide and lock pin 30 may be elongated and/or have other geometric shapes consistent with the present invention. The bottom of preferred tubular member 31 is open to prevent the build-up of debris.

A preferred embodiment of tubular member 31 has been described as having a circular cross-sectional shape. However, the present inventions are not so limited, but are preferred, so that handrails 40 may be inserted, rotated and locked into socket 25 as hereinafter described. For example, if the locking feature is not desired, the sockets may have a square, rectangular or other cross-sectional shape. The cross-sectional shape must, however, coincide with the cross-sectional shape of the mating portions 43 of the handrails 40 so that they may be inserted therein.

Figure 11:
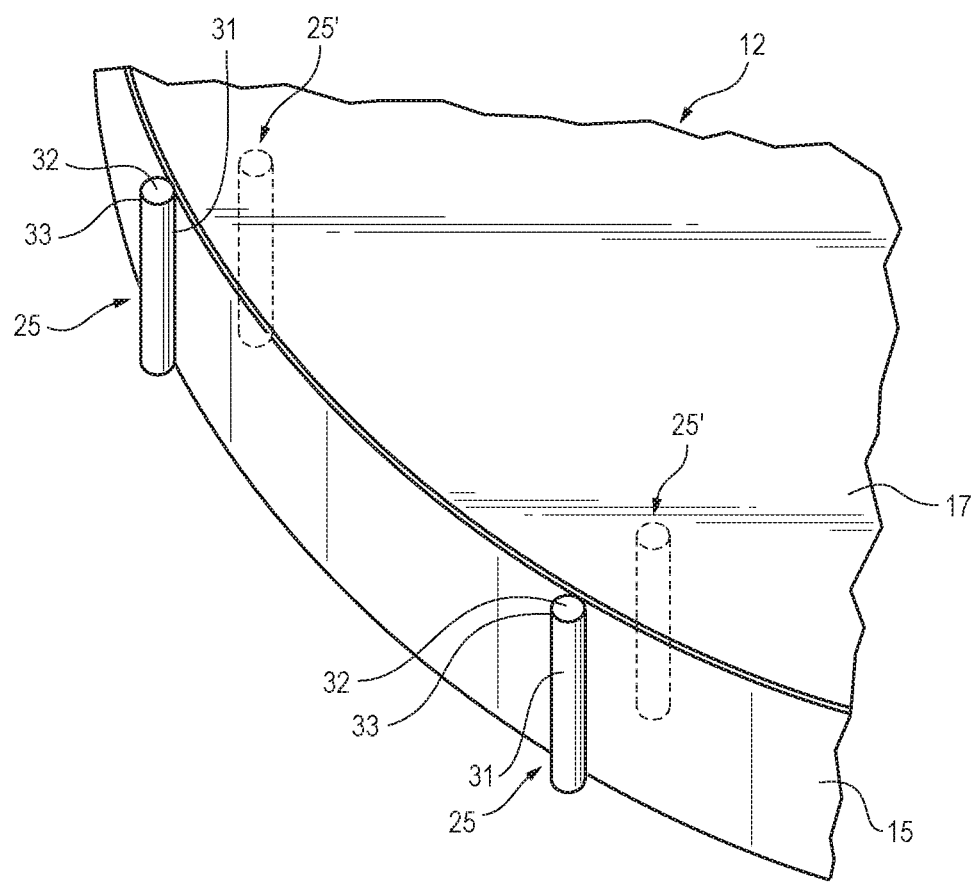
FIG. 11 is a perspective view of alternative embodiments of the present invention showing sockets attached to or made part of the float assembly.

Mounting bracket 21 is preferably secured to or made part of float 12. With reference to FIGS. 2 and 3, in the preferred embodiment, mounting bracket 21 is secured to float 12 along its perimeter 15. In the preferred embodiment, top lip 28 is welded, epoxied or otherwise secured to the upper surface 17 of float 12. Similarly, flanged skirts 27 on each side 23 of bracket 21 are welded, epoxied or otherwise secured to the perimeter surface 15 of float 12. It will be understood by those of skill in the art that there are numerous ways to attach mounting bracket 21 to float 12. For example, structures other than flanged skirts 27 and top lip 28 may be used to secure mounting bracket 21 to float 12, such as simply using the side portions 23 and the edge of upper portion 24. In an alternative embodiment of the present invention, as shown in FIG. 11, sockets 25 may be made part of or attached directly to the perimeter 15 of float 12, so that preferred mounting bracket 21 is not required. In yet another alternative, sockets $25^1$ may be attached to or made part of float 12 and extend from the upper surface 17 to lower surface 16 (FIG. 11).

A preferred embodiment of removable handrails 40 may best be seen by reference to FIGS. 7-10. Handrails 40 may include a guard rail portion 41, a support post 42 and a mating portion 43 at the bottom or lower end 47 of support post 42. In a preferred embodiment, mating portion 43 includes a channel and lock slot assembly shown generally as 45. In particular, channel and lock slot assembly 45 includes a generally vertical receiving channel 46 that extends longitudinally upward from the bottom 47 of mating portion 43 (see FIGS. 7 and 9). At its upper end, receiving channel 46 terminates at upper stop 44 and forms a rotation guide channel 48 that extends laterally from each opposing side of receiving channel 46. Rotation guide channel 48 terminates in end portion 51. The preferred embodiment of channel and lock slot assembly 45 also includes a lock portion 50 having an upper end 49, the lock portion 50 in communication with rotation guide channel 48.

The installation of preferred removable handrails 40 into preferred mounting bracket 21, as well as their interaction with preferred channel and lock slot assembly 45, will be described by reference to FIGS. 6-10. Initially, the bottom 47 and mating portion 43 of support post 42 is aligned with and inserted into the upper end 33 of tubular member 31 through the openings 32 on upper bracket portion 24. Handrail 40 is rotated until guide and lock pin 30 aligns with receiving channel 46 of preferred channel and lock slot assembly 45. Upon alignment, mating portion 43 will be inserted further into tubular member 31 until guide and lock pin 30 contacts upper stop 44. Then, depending into which socket 25 mating portion 43 is inserted, and assuming the two handrails 40 are identical in construction, handrail 40 is rotated clockwise or counterclockwise until guide and lock pin 30 contacts end portion 51. At that point, mating portion 43 falls lower into tubular member 31 until lock and guide pin 30 is seated in lock portion 50. As a result, handrails 40 are prevented from further rotation and locked into place in the desired position, such as that shown in FIG. 2.

The preferred channel and lock slot assembly 45 provides several advantages. First, it enables removable handrails 40, and in particular channel and lock slot assembly 45, to be of identical construction to one another and save on manufacturing cost. As importantly, the user doesn't have to determine at the site which handrail goes into which socket 25. This simplifies installation. This is because, in conjunction with the placement of guide and lock pin 30 within sockets 25 (see FIGS. 6, 9 and 10), either handrail may be inserted into socket 25 and rotated one way or the other to be locked and seated within lock portion 50 as described above. And, once inserted, removable handrail 40 cannot be removed without lifting and rotating it so that guide and lock pin 30 is aligned with receiving channel 46. This labyrinth path of the preferred embodiment of channel and lock assembly 45 requires both lifting and rotation for insertion and removal and prevents the inadvertent removal or knocking out of the handrails 40, providing an extra measure of safety for the operator.

Figure 8:
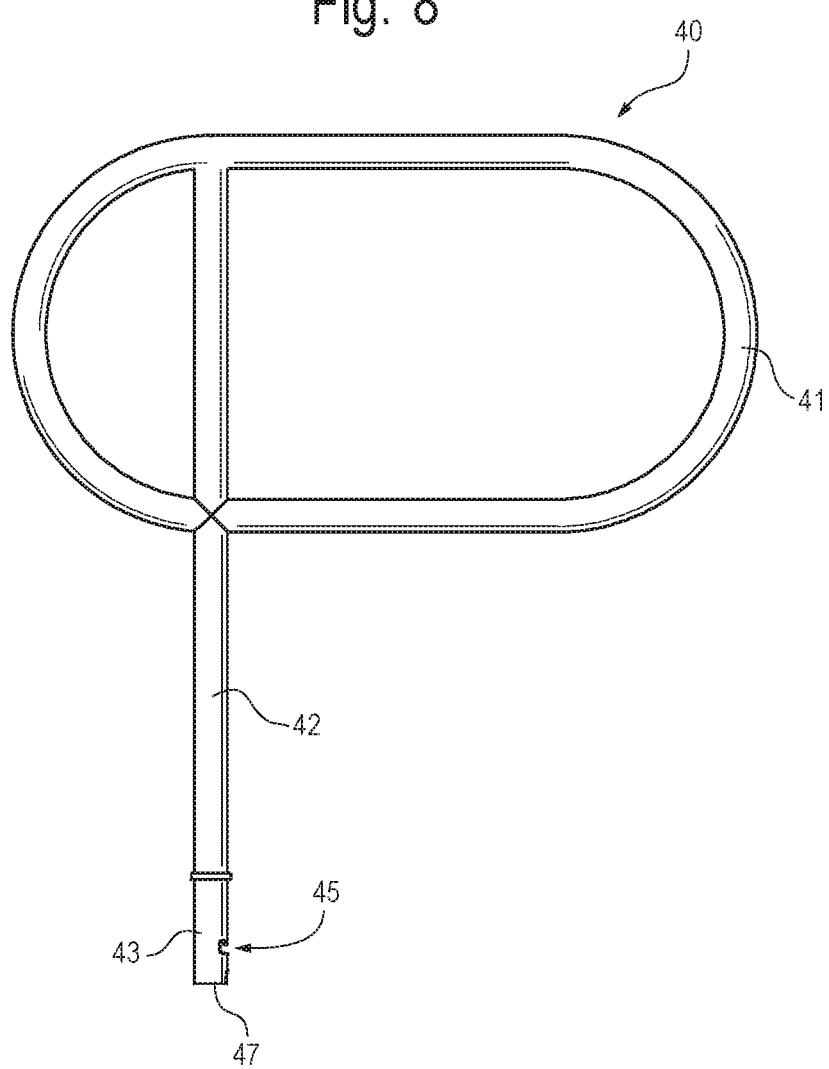
FIG. 8 is a side plan view of a preferred embodiment of a removable handrail of the present invention.

In the preferred embodiment, the receiving channel 46 of mating portion 43 is aligned on the same vertical plane as the guard rail portion 41 of handrail 40 (see FIGS. 8-10). Guide and lock pin 30 is positioned within socket 25 in the orientation shown in FIG. 6. As will be understood by those of skill in the art, when guide and lock pin 30 and receiving channel 46 are arranged in this manner, when mating portion 43 is inserted into each socket, one handrail 40 is rotated one way and the other handrail 40 is rotated the other way such that each handrail 40 is locked into socket 25 as described above so that the guard rail portions are parallel as shown in FIG. 2.

It will be further understood by those of skill in the art that the guide and lock pin 30 may be placed within socket 25 in a variety of locations around the socket 25, depending upon the manufacture of handrails 40. The location of receiving channel 46 on mating portion 43 in the preferred embodiment is the location such that the guard rail portions 41 of handrails 40 are generally parallel to one another when in a fully installed position.

It will also be understood that the present inventions do not require the preferred channel and lock slot assembly 45. For example, mating portion 43 of support post 42 may be provided only with one slot equivalent to receiving channel 46. In this manner, mating portion 43 may be inserted into socket 25 so that guide and lock pin 30 is aligned with receiving channel 46. Once inserted, rotation of handrail 40 is prevented. This alternative embodiment, however, would not have the preferred safety lock feature. Alternatively, a receiving channel 46 and only one rotation guide channel 48 (with or without lock portion 50) may be provided on mating portion 43. Then, if only one construction of handrail 40 is desired, guide and lock pin 30 has to be appropriately placed within socket 25 so that the handrail 40 will be properly installed. Those of skill in the art will understand the relationship of guide and lock pin 30 and the placement of receiving channel 46 (as well as any rotation guide channels 48 and/or lock portion 50) of the present invention to provide the proper alignment of handrail 40 when installed.

Although not preferred, only one socket 25 and one handrail 40 may be used as an embodiment of the present invention.

An alternative embodiment of the present invention is shown in FIG. 11. In that embodiment, two sockets 25 are attached directly to the perimeter or outer edge 15 of float 12. It will be understood by those of skill in the art that sockets 25 in the alternative embodiment may or may not include guide and lock pin 30, depending upon the construction of mating portion 43 of handrails 40. It will further be understood by those of skill in the art that sockets $25^1$ may be formed as part of float 12. For example, sockets $25^1$ may extend between upper surface 17 and lower surface 16 of float 12.

The above description is not intended to limit the meaning of the words used in or the scope of the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention. In addition, although the term "claimed invention" or "present invention" is sometimes used herein in the singular, it will be understood that there are a plurality of inventions as described and claimed.

Various features of the present inventions are set forth in the following claims.

What is claimed is:

1. A safety access system for use on float assemblies, the float assembly including a float having a top surface and a perimeter surface, the safety access system comprising:
   a mounting bracket having a front portion, two side portions and a rear portion;
   two sockets, one socket attached to each side of the rear portion of the mounting bracket;
   two removable handrails, each handrail having a support post, the support post supporting a guard rail portion, the support post having a lower or mating portion;
   a guide and lock pin positioned within each socket; and,
   a receiving channel and two opposing rotation guide channels in communication with each side of the receiving channel on the mating portion of the support post which cooperates with the guide and lock pin such that the mating portion of the support post is engaged in the socket.

2. The safety access system of claim 1 wherein the mating portion of the support post further includes at least one lock portion in communication with the rotation guide channel.

3. The safety access system of claim 2 wherein two lock portions are provided, one in communication with each rotation guide channel.

4. A safety access system for use on a float assembly, the float assembly including a top surface and a perimeter, the safety system comprising:
   at least one socket attached to the float;
   a guide and lock pin positioned within the socket;
   at least one removable handrail having a support post, the support post having a lower mating portion; and,
   a receiving channel and two opposing rotation guide channels, each of which are in communication with the receiving channel on the mating portion of the support post which cooperates with the guide and lock pin such that the mating portion of the support post is engaged in a particular orientation in the socket.

5. The safety access system of claim 4 wherein the mating portion of the support post further includes at least one lock portion in communication with the rotation guide channel.

6. The safety access system of claim 5 wherein two lock portions are provided, one lock portion in communication with each rotation guide channel.

7. The safety access system of claim 4 wherein the at least one socket is attached to the perimeter of the float.

8. The safety access system of claim 4 wherein two sockets are provided, each socket attached to or formed as part of the mounting bracket attached to the float.

9. A safety access system for floats, the floats having a top surface and a perimeter surface, the system comprising:

a mounting bracket having a front, two sides and a rear, the mounting bracket attached to the perimeter of the float;

two sockets, each socket formed of a tubular member, each tubular member attached to each side and to the rear of the mounting bracket;

two removable handrails, each handrail having a support post, the support post having a lower or mating member and an upper member supporting a guard rail portion;

a guide and lock pin positioned within the tubular member of each socket; and, a channel and lock slot assembly on the mating portion of the support post, the channel and lock slot assembly including a receiving channel, two opposing rotation guide channels in communication with the receiving channel, wherein the receiving channel and rotation guide channel cooperate with the guide and lock pin.

10. The safety access system of claim 9 wherein each rotation guide channel terminates in a lock channel in communication with the rotation guide channel.

* * * * *